| United States Patent [19] | [11] | 4,194,905 |
| Gallacher | [45] * Mar. 25, 1980 |

[54] SOLVENT-EXTRACTION PROCESS FOR RECOVERY AND SEPARATION OF METAL VALUES

[75] Inventor: Lawrence V. Gallacher, East Norwalk, Conn.

[73] Assignee: King Industries, Inc., Norwalk, Conn.

[ * ] Notice: The portion of the term of this patent subsequent to Apr. 19, 1994, has been disclaimed.

[21] Appl. No.: 785,669

[22] Filed: Apr. 7, 1977

Related U.S. Application Data

[63] Continuation-in-part of Ser. No. 671,346, Mar. 29, 1976, Pat. No. 4,018,865.

[51] Int. Cl.$^2$ .................. C22B 23/04; C22B 15/00; C22B 19/22
[52] U.S. Cl. .................. 75/101 BE; 75/117; 75/119; 75/120; 75/121; 423/24; 423/99; 423/139

[58] Field of Search .................. 75/101 BE, 117, 119, 75/20, 121; 423/24, 99, 139

[56] References Cited

U.S. PATENT DOCUMENTS

| 3,649,220 | 3/1972 | Powell et al. .................. 423/99 |
| 3,878,286 | 4/1975 | Morin et al. .................. 75/101 BE |
| 4,018,865 | 4/1977 | Gallacher .................. 75/101 BE |
| 4,120,817 | 10/1978 | Hummelstedt .................. 75/117 X |

*Primary Examiner*—G. Ozaki
*Attorney, Agent, or Firm*—Morgan, Finnegan, Pine, Foley & Lee

[57] ABSTRACT

Solvent-extraction processes to recover metal values are improved by use as a component of the solvent-extractant of didodecylnaphthalene sulfonic acid. Especially important applications for the improved solvent-extractant which can include a α-hydroxy oxime are in the separation recovery of copper, nickel, zinc and cobalt and the selective separation of these metals, one from the other, and from iron, in acidic aqueous media.

13 Claims, No Drawings

SOLVENT-EXTRACTION PROCESS FOR RECOVERY AND SEPARATION OF METAL VALUES

CROSS REFERENCE TO RELATED APPLICATION

This application is a continuation-in-part of copending application Ser. No. 671,346, filed Mar. 29, 1976, and now U.S. Pat. No. 4,018,865.

This invention relates to a solvent-extractant method for recovering metal values from aqueous acidic media. In particular, it is concerned with the use of didodecylnapthalene sulfonic acid as an improved extractant in such methods.

BACKGROUND OF THE INVENTION

Solvent-extraction processes used for the recovery and refining of metals are well known and reference is made to the disclosure of Gallacher, U.S. application Ser. No. 671,346, filed Mar. 29, 1976; Swanson, U.S. Pat. Nos. 3,224,873; Swanson, 3,428,449; Hazen and Coltrinari, 3,872,209; and Morin and Peterson, 3,878,286, each of which is incorporated herein by reference. Such processes typically involve continuous recycling of three streams: an aqueous leaching solution which contains the desired metal value, a water-insoluble organic extractant, and an aqueous stripping solution which recovers and concentrates the metal value for electrical or chemical removal later.

In a typical process for refining copper, a low-grade copper ore is leached by dilute sulfuric acid to produce a leach solution containing 2–4 grams per liter of copper and approximately the same concentration of ferric ($Fe^{+3}$) iron. The aqueous leach solution is then contacted with an organic extractant in kerosene at a 1:1 phase volume ratio in a counter-current sequence of mixer-settlers to produce an organic extract containing almost all of the copper from the original aqueous leach and a negligible amount of the iron. The organic extract in turn is contacted with a sulfuric acid acid stripping solution or "spent electrolyte" containing about 30 grams per liter copper at a very low phase volume ratio to generate an aqueous "loaded electrolyte" containing about 50 grams of copper per liter. The loaded electrolyte is passed through an electrowinning cell to produce cathode copper and simultaneously regenerate the stripping solution.

In the operation of solvent-extraction metal refining processes, it is apparent that extraction of species other than the desired metal value must be minimized, as well as other losses, e.g., formation of insoluble complexes. It is also apparent that phase separation rates in the extraction and stripping steps should be rapid in order to minimize the volumes of separation vessels and thereby reduce the solvent inventory and equipment costs necessary to construct and start up a solvent-extraction process plant.

Thus, it is important that after extraction and stripping, the separated organic and aqueous phases contain minimum levels of suspended particles or droplets of the second phase. Each phase should be as clear as possible with minimum haze. This haze is commonly referred to as "secondary" haze because it persists after primary phase disengagement is complete. In general, the organic extractant is considerably more valuable than either the leaching or stripping solutions, and, therefore, haze in the aqueous phases after extraction or stripping is particularly undesirable, since it represents potential extractant losses. A secondary haze of only 0.001% in the separated aqueous phase after extraction in a process which recycles the organic extractant every 30 minutes will result in an extractant make-up requirement of approximately 15% per year.

It is obvious that extractant losses due to aqueous solubility can be just as critical as losses through second-phase dispersions.

The formation of insoluble species, particularly in the organic phase, is also to be avoided. Such species can form in several ways, including simple protonation of the active extractant to form an insoluble salt, e.g., a bisulfate, or by formation of an insoluble metal complex.

Dinonylnaphthalene sulfonic acid (DNNSA) is known to be an effective cation extractant, particularly under strongly acid conditions where other acid extractants fail to function. As U.S. Pat. No. 4,018,865 shows, DNNSA can be combined with aliphatic alpha hydroxy oximes to produce highly selective extractants. In the same application it is shown that the closely related didodecylnaphthalene sulfonic acid (DDNSA) can also be combined with aliphatic alpha hydroxy oximes to produce highly selective extractants.

Surprisingly, it has now been found and is the subject of this invention that extractant solutions containing either DDNSA alone or in combination with aliphatic alpha hydroxy oximes are consistently superior to the corresponding DNNSA extractants in one or more of the critical characteristics described above.

SUMMARY OF THE INVENTION

According to the present invention, there is provided in a process for recovering an extractable metal value from an aqueous medium comprising said metal value, said process comprising contacting said aqueous medium at a pH of below about 4 with a solvent-extractant comprising an alkyl-aromatic sulfonic acid and a water-immiscible solvent for said sulfonic acid and for complexes of said sulfonic acid with said metal value to provide an extract of said metal value in said solvent-extractant, separating the solution thus formed from the aqueous raffinate depleted in said metal value, and recovering said metal value from said extract, the improvement which comprises using didodecylnaphthalene sulfonic acid as said extractant.

Many of the modern mining and metallurgical procedures can be carried out to produce suitable aqueous metal feed solutions for the present process. The process of the present invention has specific application to the recovery and/or separation of copper, nickel, zinc and cobalt values from an aqueous solution of copper, nickel, zinc, cobalt alone, in admixture and including iron values. The process can be used to obtain a first solvent fraction concentrated in copper or other metal and an aqueous raffinate fraction depleted in the first metal and/or concentrated in a second metal, e.g., iron. The following pairs of metals are suitable feed solutions for the one aspect of the present process to separate the metals from each other: copper from iron, nickel from iron, nickel from cobalt, copper from cobalt, copper from nickel, copper from zinc, zinc from nickel, nickel from zinc, zinc from iron, and cobalt from zinc.

In one of its features, the present invention employs a solvent-extractant which also includes an α-hydroxy oxime.

In general, any of the α-hydroxy oximes described in U.S. Pat. No. 3,224,873 are suitable for use in this embodiment of the present process. In general, these α-hydroxy oxime extractants (i) have the formula

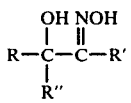

wherein R, R' and R" may be any of a variety of organic hydrocarbon radicals such as aliphatic and alkylaryl radicals; and R" may also be hydrogen. Preferably, R and R' are unsaturated hydrocarbon or branched chain alkyl groups, containing from about 4 to 20 carbon atoms; R and R' are also preferably the same, and when alkyl are preferably attached to the carbons substituted with the —OH and =NOH groups attached through a secondary carbon atom. It is also preferred that R" is hydrogen or unsaturated hydrocarbon or branched chain alkyl group containing from about 4 to 20 carbon atoms. The α-hydroxy oximes also preferably contain a total of about 10 to 42 carbon atoms. Representative compounds are given in the foregoing reference and processes are disclosed for preparing them.

Typical compounds are 19-hydroxyhexatriconta-9,27-dien-18-oxime; 5,10-diethyl-8-hydroxytetradecan-7-oxime; and 5,8-diethyl-7-hydroxydodecane-6-oxime. The latter compound has the following structural formula:

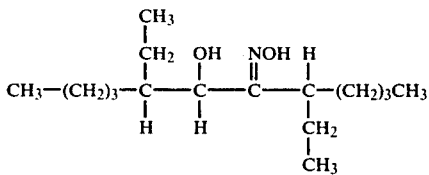

Representative of other mono- and poly-unsaturated radicals are heptenyl, octenyl, decenyl, dodecenyl, octadecenyl and alkyl substituted radicals such as ethyloctadecenyl. Representative of other mono- and polyalkyl-substituted saturated radicals are ethylhexyl, diethylheptyl, butyldecyl, butylhexadecyl, ethylbutyldodecyl, butylcyclohexyl, and the like.

The α-hydroxy oxime component is also characterized as having a solubility of at least 2% by weight in the hydrocarbon solvent used to make up the organic phase and substantially complete insolubility in water.

The didodecylnaphthalene sulfonic acid used in practicing the present process is available, for example, by sulfonating didodecylnaphthalene. The didodecylnaphthalene can be made by alkylating naphthalene with olefins, for example, a didodecyl halide, or preferably propylene tetramer, with a suitable catalyst, e.g., hydrogen fluoride or anhydrous aluminum chloride in a suitable solvent such as naphtha, sulfur dioxide, nitrobenzene or a mixture of benzene and nitrobenzene. See Robert G. King and George W. Thielcke, U.S. Pat. No. 2,764,548, assigned to the assignee of the present invention. Such a process produces a naphthalene substituted with dodecyl groups and, if a branched olefin is used, such as propylene tetramer,—obtained by polymerizing propylene by an acid catalyst such as phosphoric acid—, then the dodecyl groups will be highly branched as well. Sulfonation is obtained by treating the didodecylnaphthalene with a sulfonating agent. For example, the dialkyl aromatic compound is dissolved in an inert solvent, such as petroleum naphtha, hexane, heptane, octane, chlorinated solvents, and the like, and sulfuric acid, preferably oleum, is introduced into the solution at the desired temperature and with agitation. After reaction is complete, the sulfonic acid—and also some polysulfonic acid—is recovered by adding water to selectively extract any polysulfonic acid, leaving the alkylaromatic sulfonic acid in the organic phase. Detailed techniques for preparing didodecylnaphthalene sulfonic acid and isomers thereof, is described in the King et al patent, U.S. Pat. No. 2,764,548, incorporated herein by reference.

The solvent-extractant as contemplated above, includes (i) didodecylnaphthalene sulfonic acid, optionally, (ii) an aliphatic α-hydroxy oxime and (iii) a water-immiscible solvent for (i) and (ii), if present, and metal complexes of (i), and (ii), if present. A wide variety of water-immiscible organic solvents (diluents), in which the extraction reagents (i) and (ii), if present, are dissolved, can be employed according to this invention. The minimum requirements for the diluent (iii), however, are that the diluent be substantially water-immiscible, that it will dissolve the extraction reagents, and metal complexes thereof and that it will not interfere with the function of the reagent in extracting the metal values from acid solutions. These diluents can be aliphatic or aromatic hydrocarbons, halogenated hydrocarbons, petroleum derivatives, ethers, etc. Examples of these various diluents include toluene, carbon tetrachloride, benzene, xylene, fuel oil, chloroform, 2-ethyl-hexanol, and particularly kerosene. Especially preferred is a solvent which is an aliphatic normally liquid hydrocarbon substantially free of aromatic hydrocarbon content.

Generally, the didodecylnaphthalene sulfonic acid extractant will be present in the organic phase in an amount sufficient to extract at least a portion of the values, e.g., copper values, from the aqueous solutions. Preferably, the sulfonic acid will be present in the amount of from about 1 to about 50% by weight based on the total organic phase with an amount of from 2 to 25% by weight being particularly preferred. If an α-hydroxy oxime (ii) is present, the amounts of combined (i) and (ii) will generally fall within the stated ranges.

Although the volumetric phase ratios of the organic extractant to the aqueous solution can vary depending upon several factors including the amount of metal value present in the aqueous phase and the concentrations of didodecylnaphthalene sulfonic acid (i) and, optionally hydroxy oxime (ii) in the organic phase, generally, volumetric phase ratios of from about 1:3 to about 3:1 will be used. These ratios will extract essentially all of the metal values from the aqueous solution within a small number of extraction stages, e.g., 5 or less. In continuous column extractors or similar equipment, 5 or fewer contacts or theoretical plates will normally suffice Under most circumstances, an extraction or contacting period per stage of at most five minutes is sufficient, although the extraction time usually may be reduced to 1 or 2 minutes, and often 30 seconds or less.

The solvent-extractant reagent may be contacted with the metal containing aqueous feed by any of the well-known procedures employed in solvent-extractions. While continuous countercurrent methods are preferred, batch, continuous batch, and batch countercurrent methods may also be used. The liquid-liquid contacting means may comprise a pulsed column, a countercurrent rotating disc column, and other known systems. Mixing may be carried out at conventional temperatures, advantageously in the range of about 10° C. to 40° C.

With DDNSA alone, extraction will generally take place at pH's at or above 0.4. With α-hydroxy oxime in the extractant, for selective extractions, these generally will take place at a pH of below about 4.0 preferably below 3.0 and especially preferably in the range of 0.75 to 2.5. For the pair copper and iron, the most preferable pH is from about 0.9 to 2.0; for the pair nickel and iron, the most preferable range is from about 1.0 to about 2.0; for the pair nickel and cobalt, the most preferable pH is from about 0.98 to 2.0; for the pair copper and nickel, the most preferable range is from about 1.0 to about 2.5; for the pair copper and cobalt, the most preferable range is from about 1.0 to about 2.5; for the pair copper and zinc, the most preferable range is from 1.0 to about 2.0; for the pair of nickel and zinc (and zinc and nickel), the most preferable range is 1.0 to about 2.0; and for the pair zinc and iron, the most preferable range is 1.0 to about 2.3.

The organic phase to aqueous phase volume ratio can be varied broadly and the most efficient ratio in each case can be readily determined by one skilled in the art. The particular ratio selected for any given extraction may depend upon the extraction reagent, diluent, and type of metal bearing solution employed as well as their concentration and the method of mixing them, and the like.

After the metal values have been transferred to the organic phase and the aqueous and organic phases separated, the organic phase containing the metal value is stripped in any suitable liquid-liquid contactor. In the stripping operation, the metal-containing organic phase is contacted with 3 to 150% by volume of a mineral acid, e.g., sulfuric, nitric or hydrochloric, the choice of acid depending on the anion of the metal required.

For convenience, the extraction, separation of phases and stripping operations may be carried out on a test basis in separatory funnels. These correlate well with commercial size operations. Equipment useful in commercial practice is well known and is described in Mining Engineering, 17, pp. 76-80, December, 1965. The determination of maximum loading capacity of the organic solution for metals, equilibrium isotherms for extraction and stripping, and use of the equilibrium isotherms for determining the number of extraction stages required for substantially complete removal of the metal are set forth in the article, which is incorporated herein by reference.

In a commercial operation, the aqueous feed and the extractant solutions are fed in the desired ratio into a small agitated mixer. After mixing for one to two minutes, or less, the mixture overflows to a settler for a period of about five minutes residence. The phases are then separated continuously, the aqueous raffinate being drawn off and the organic layer transferred to an agitated stripper vessel where acid is added and mixed for about one or two minutes or less. The mixture is then transferred to a settler where, after a few minutes, the phases are separated.

DESCRIPTION OF THE PREFERRED EMBODIMENT

The following examples illustrate the process of the present invention. They are not to be construed to limit the claims in any manner whatsoever.

Whenever the same wt. percentages of DNNSA and DDNSA are used, the mole % DNNSA is 18% higher than the mole % DDNSA. Therefore, the extraction efficiency of DNNSA solutions will normally be higher than that of DDNSA solutions at the same wt. %, but is not higher when the same mole % of each acid is used. This applies to Examples 1-16.

EXAMPLES 1-4

Copper is recovered from an acidic aqueous medium with didodecylnaphthalene acid (DDNSA) as follows: 25 ml. portions of feed comprising 2 g./l. of copper (as copper sulfate), adjusted, respectively, to pH's of 0.5, 1.0, 1.5 and 2.0 with dilute sulfuric acid, are shaken in a 50 ml. stoppered graduated cylinder for one minute with 25 ml. of extractant. The extractant comprises 11.8% by weight of DDNSA in kerosene. After shaking for one minute, the time required for complete phase separation is measured. The extracts are acid-stripped by shaking with 25 milliliters of 20% aqueous sulfuric acid for one minute, and again the time required for complete phase separation is measured. After the extraction step, the aqueous feed is analyzed and the percent depletion in copper value content is determined by atomic absorption spectrophotometry. For comparison purposes, the procedures are repeated substituting as the extractant, an 11.8% by weight solution of dinonylnaphthalene sulfonic acid (DNNSA) in kerosene. The results obtained are set forth in Table 1:

Table 1

| | Extraction of Copper From Acidic Aqueous Media with DDNSA and DNNSA | | | | | | | |
|---|---|---|---|---|---|---|---|---|
| Examples | 1 | 2 | 3 | 4 | 1A* | 2A* | 3A* | 4A* |
| pH | 0.5 | 1.0 | 1.5 | 2.0 | 0.5 | 1.0 | 1.5 | 2.0 |
| DDNSA, wt. % in kerosene | 11.8 | 11.8 | 11.8 | 11.8 | — | — | — | — |
| DNNSA, wt. % in kerosene | — | — | — | — | 11.8 | 11.8 | 11.8 | 11.8 |
| Separation time, minutes | | | | | | | | |
| (after extraction) | 11 | 12 | 11 | 9 | 326 | 302 | TSTM | TSTM |
| (after acid stripping) | 10 | 12 | 11 | 9 | 178 | 145 | TSTM | TSTM |
| Copper extracted, % | 13 | 56 | 96 | 89 | 22 | 62 | — | — |

*Control
**TSTM - too slow to measure

These data clearly demonstrate the remarkable decrease in separation times, both after extraction and after stripping, when DDNSA is employed as an extractant. Moreover, when using DDNSA much less haze is observed and the separation is markedly cleaner. In either case, copper values are efficiently extracted from the aqueous media. However, it can be seen that DNNSA is not as efficient as DDNSA at pH's of 1.5-2.0, because separations are too slow to measure.

EXAMPLES 5-8

The procedures of Examples 1-4 are repeated, substituting for the copper, 2 g./l. of nickel (as nickel sulfate). Because separation times with DNNSA at pH's of 1.5 and 2.0 are too slow to measure, these experiments are not repeated for control purposes. The results are set forth in Table 2:

Table 2

Extraction of Nickel from Aqueous Media with DDNSA and DNNSA

| Examples | 5 | 6 | 7 | 8 | 5A* | 6A* |
|---|---|---|---|---|---|---|
| pH | 0.5 | 1.0 | 1.5 | 2.0 | 0.5 | 1.0 |
| DDNSA, wt. % in kerosene | 11.8 | 11.8 | 11.8 | 11.8 | — | — |
| DNNSA, wt. % in kerosene | — | — | — | — | 11.8 | 11.8 |
| Separation times, minutes | | | | | | |
| (after extraction) | 14 | 15 | 17 | 19 | 315 | 315 |
| (after acid stripping) | 14 | 15 | 15 | 15 | 113 | 170 |
| Nickel extracted, % | 20 | 58 | 85 | 94 | 25 | 59 |

*Control

Again, the remarkable decrease in separation times when using DDNSA as an extractant is observed.

EXAMPLES 9-12

The procedures of Examples 1-4 are repeated, substituting 2 g./l. of cobalt (as cobalt sulfate) for the copper-containing aqueous feed. The results obtained are set forth in Table 3:

Table 3

Extraction of Cobalt from Aqueous Media with DDNSA and DNNSA

| Examples | 9 | 10 | 11 | 12 | 9A* | 10A* |
|---|---|---|---|---|---|---|
| pH | 0.5 | 1.0 | 1.5 | 2.0 | 0.5 | 1.0 |
| DDNSA, wt. % in kerosene | 11.8 | 11.8 | 11.8 | 11.8 | — | — |
| DNNSA, wt. % in kerosene | — | — | — | — | 11.8 | 11.8 |
| Separation times, minutes (after extraction) | 18 | 18 | 17 | 19 | 405 | 375 |
| (after acid stripping) | 12 | 12 | 12 | 13 | 132 | 120 |
| Cobalt extracted, % | 25 | 58 | 85 | 92 | 29 | 57 |

*Control

Again, the data demonstrate the remarkable decreases in separation times obtained by using DDNSA.

EXAMPLES 13-16

The procedures of Examples 1-4 are repeated, substituting 2 g./l. of zinc (as zinc sulfate) for the copper. The results obtained are set forth in Table 4:

Table 4

Extraction of Zinc from Aqueous Media with DDNSA and DNNSA

| Examples | 13 | 14 | 15 | 16 | 13A* | 14A* |
|---|---|---|---|---|---|---|
| pH | 0.5 | 1.0 | 1.5 | 2.0 | 0.5 | 1.0 |
| DDNSA, wt. % in kerosene | 11.8 | 11.8 | 11.8 | 11.8 | — | — |
| DNNSA, wt. % in kerosene | — | — | — | — | 11.8 | 11.8 |
| Separation time, minutes | | | | | | |
| (after extraction) | 14 | 15 | 16 | 18 | 330 | 330 |
| (after acid stripping) | 13 | 13 | 12 | 13 | ND** | ND** |
| Zinc extracted, % | 17 | 48 | 87 | 90 | 20 | 55 |

*Control
**ND - not determined

Again, it is seen that the use of DDNSA provides a remarkable decrease in separation times.

EXAMPLES 17-22

A combination of dialkylarylsulfonic acid and 5,8-diethyl-7-hydroxydodecan-6-one oxime (DEHDO) in kerosene is used as an extractant for copper values from acidic aqueous media. The procedures of Examples 1-4 are repeated, substituting DDNSA and DEHDO, and DNNSA and DEHDO in kerosene, for DDNSA and DNNSA, alone, in kerosene. The amounts of the respective ingredients used and the results obtained are set forth in Table 5:

Table 5

Extraction of Copper from Acidic Aqueous Media with DDNSA-DEHDO and DNNSA-DEHDO

| Examples | 17 | 18 | 19 | 20 | 21 | 22 | 17A* | 18A* | 19A* | 20A* | 21A* | 22A* |
|---|---|---|---|---|---|---|---|---|---|---|---|---|
| pH | 0.5 | 1.0 | 1.5 | 2.0 | 1.0 | 2.0 | 0.5 | 1.0 | 1.5 | 2.0 | 1.0 | 2.0 |
| DDNSA, wt. % in kerosene | 4.7 | 4.7 | 4.7 | 4.7 | 2.4 | 2.4 | — | — | — | — | — | — |
| DNNSA, wt. % in kerosene | — | — | — | — | — | — | 4.0 | 4.0 | 4.0 | 4.0 | 2.0 | 2.0 |
| DEHDO, wt. % in kerosene | 2.4 | 2.4 | 2.4 | 2.4 | 3.2 | 3.2 | 2.4 | 2.4 | 2.4 | 2.4 | 3.2 | 3.2 |
| Separation time, minutes | | | | | | | | | | | | |
| (after extraction) | 11 | 12 | 8 | 6 | 7 | 13 | 6 | 10 | 13 | 7 | 1 | 8 |
| (after acid stripping) | 9 | 8 | 8 | 8 | 2 | 6 | 5 | 5 | 6 | 1 | 2 | |
| Copper extracted, % | 18 | 44 | 63 | 71 | 51 | 54 | 26 | 46 | 64 | 71 | 50 | 55 |
| Haze in aqueous layers | no | no | no | no | no | no | cloudy | cloudy | milky | milky | milky | milky |
| Precipitate at interface | none | none | none | light | light | light | light, thin, chocolate brown | light, thin, chocolate brown | heavy | heavy | heavy | heavy |

*Control

Although the combinations of DEHDO with either DDNSA or DNNSA show fast separation times in both cases, marked differences in separation effectiveness are observed. DDNSA is superior in such combinations because separation occurs with no haze in the aqueous layers and a very light or no precipitate at the interface. In essence, there is a clear and clean separation of layers. In contrast thereto, with DNNSA in the combination, in spite of the fast phase separation, the aqueous layers are cloudy, and, in fact, milky, at the higher pH's. In addition, in following the procedure of Examples 17 and 17A with DNNSA a thin chocolate brown layer forms at the interface, following the complete disappearance of haze in the aqueous layer after several hours.

EXAMPLES 23-24

The procedures of Examples 1-4 are repeated, substituting for the feed solution, an aqueous feed comprising 4.0 g./l. of copper (as copper sulfate) and 0.8 g./l. of ferrous iron (as ferrous sulfate), and 4.0 g./l. of ferric iron (as ferric sulfate). The concentration of dialkyl aromatic sulfonic acid in the solvent is doubled. Instead of kerosene, there is used a hydrocarbon solvent substantially free of aromatic contant, having a boiling range of 384°-430° F. The concentrations used and the results obtained are set forth in Table 6:

Table 6

Selective Extraction of Copper from Iron in Acidic Aqueous Media with DDNSA and with DNNSA

| Examples | 23 | 24 | 23A* | 24A* |
|---|---|---|---|---|
| pH | 0.5 | 1.0 | 0.5 | 1.0 |
| DDNSA, wt. % in hydrocarbon** | 23.6 | 23.6 | — | — |
| DNNSA, wt. % in hydrocarbon** | — | — | 20.0 | 20.0 |
| Separation time, minutes (after extraction) | 13 | 14 | 16 | 19 |
| Copper extracted, % | 17 | 41 | 17 | 38 |
| Iron extracted, % | 9 | 37 | 8 | 35 |
| Haze in aqueous layers | none | none | none | none |
| Precipitate in interface | none | none | heavy | heavy |

*Control
**Hydrocarbon solvent, aliphatic and substantially free of aromatic content, b.p., 384°-430° F.

These data demonstrate that both sulfonic acids provide selective extractions of copper in the presence of iron at the more acidic pH value. Although separation times are rapid with either sulfonic acid, again it is observed that a substantially cleaner interface is obtained with DDNSA in contrast to DNNSA.

EXAMPLES 25-30

The procedures of Examples 23-24 are repeated, substituting for the respective extractants, hydrocarbon solutions also comprising DEHDO. The amounts of reagents used and the results obtained are set forth in Table 7.

Table 7

Selective Extraction of Copper from Acidic Aqueous Media Comprising Copper and Iron with DDNSA-DEHDO and DNNSA-DEHDO

| Examples | 25 | 26 | 27 | 28 | 29 | 30 | 25A* | 26A* | 27A* | 28A* | 29A* | 30A* |
|---|---|---|---|---|---|---|---|---|---|---|---|---|
| pH | 0.5 | 1.0 | 0.5 | 1.0 | 0.5 | 1.0 | 0.5 | 1.0 | 0.5 | 1.0 | 0.5 | 1.0 |
| DDNSA, wt. % in hydrocarbon** | 4.8 | 4.8 | 9.4 | 9.4 | 14.2 | 14.2 | — | — | — | — | — | — |
| DNNSA, wt. % in hydrocarbon** | — | — | — | — | — | — | 4.0 | 4.0 | 8.0 | 8.0 | 12.0 | 12.0 |
| DEHDO, wt. % in hydrocarbon** | 6.4 | 6.4 | 4.8 | 4.8 | 3.2 | 3.2 | 6.4 | 6.4 | 4.8 | 4.8 | 3.2 | 3.2 |
| Separation time, minutes (after extraction) | 4 | 6 | 4 | 5 | 6 | 6 | 2 | 2 | 4 | 4 | 6 | 5 |
| Copper extracted, % | 39 | 50 | 20 | 45 | 22 | 52 | 41 | 48 | 20 | 45 | 20 | 50 |
| Iron extracted, % | 2 | 2 | 3 | 1 | 7 | 13 | 2 | 2 | 2 | 3 | 6 | 12 |
| Haze in aqueous layers | none | none | hazy | slight | none | none | none | none | hazy | slight | hazy | hazy |
| Precipitate at interface | none | none | light | light | none | none | light | light | medium | medium | light | light |

*Control
**Hydrocarbon solvent, aliphatic and substantially free of aromatic content, b.p., 384°-430° F.

Although there is a fast initial phase separation with sulfuric acid in combination with DEHDO, the deparation with DDNSA in the extractant is markedly cleaner at the interface than the control experiments having DNNSA in the extractant.

Obviously, many variations of the invention will suggest themselves in view of the above-detailed disclosure. For example, conventional additives to improve solubility and/or phase separation, e.g., decyl alcohol and nonyl phenyl, and the like, can be present in the solvent extractant. All such obvious variations are within the full intended scope of the appended claims.

I claim:

1. In a process for recovering an extractable metal value from an aqueous medium comprising said metal value, said process comprising contacting said aqueous medium at a pH of below about 4 with a solvent-extractant comprising an alkyl-aromatic sulfonic acid and a water-immiscible solvent for said sulfonic acid and for complexes of said sulfonic acid with said metal value to provide an extract of said metal value in said solvent-extractant, separating the solution thus formed from the aqueous raffinate depleted in said metal value, and recovering said metal value from said extract, the improvement which comprises using didodecylnaphthalene sulfonic acid as said extractant.

2. A process as defined in claim 1 wherein said metal value comprises copper.

3. A process as defined in claim 1 wherein said metal value comprises nickel.

4. A process as defined in claim 1 wherein said metal value comprises cobalt.

5. A process as defined in claim 1 wherein said metal value comprises zinc.

6. A process as defined in claim 1 wherein said metal value comprises iron.

7. A process as defined in claim 1 wherein said solvent-extractant also includes 100 parts per 75 to 444 parts of said alkyl aromatic sulfonic acid of an aliphatic α-hydroxy oxime of the formula:

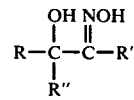

wherein R and R' are aliphatic hydrocarbon radicals and R" is hydrogen or an aliphatic hydrocarbon radical.

8. A process as defined in claim 7 wherein said aliphatic α-hydroxy oxime comprises 5,8-diethyl-7-hydroxydodecane-6-one oxime.

9. A process as defined in claim 8 wherein said metal value comprises copper.

10. A process as defined in claim 7 wherein said aqueous medium comprises a pair of a first metal value and a second metal value, and said solvent-extractant selectively removes said first metal value.

11. A process as defined in claim 10 wherein said first metal value is copper and said second metal value is iron.

12. A process as defined in claim 1 wherein said aqueous medium comprises a pair of a first metal value and a second metal value, and said solvent-extractant selectively removes said first metal value.

13. A process as defined in claim 12 wherein said first metal value comprises copper and said second metal value comprises iron.